United States Patent [19]

Tsurumi et al.

[11] Patent Number: 5,145,023
[45] Date of Patent: Sep. 8, 1992

[54] MOTORCYCLE FUEL TANK PROVIDING MULTIPLE ENHANCEMENTS

[75] Inventors: Yashuyuki Tsurumi; Mamoru Isomura, both of Shiki, Japan

[73] Assignee: Honda Giken Kogyo Kabushiki Kaisha, Tokyo, Japan

[21] Appl. No.: 363,206

[22] Filed: Jun. 8, 1989

[30] Foreign Application Priority Data

Jun. 10, 1988 [JP] Japan ................................ 63-77130
Jul. 29, 1988 [JP] Japan ................................ 63-101778
Nov. 18, 1988 [JP] Japan ................................ 63-150501

[51] Int. Cl.⁵ .......................... B62C 1/00; B62D 61/00
[52] U.S. Cl. ................................ 180/68.1; 180/68.6; 180/229; 280/835
[58] Field of Search ............... 180/219, 225, 229, 68.1, 180/68.3, 68.6; 280/833, 835

[56] References Cited

U.S. PATENT DOCUMENTS

| 4,478,306 | 10/1984 | Tagami | 180/229 |
| 4,508,189 | 4/1985 | Kato | 180/219 |
| 4,648,474 | 3/1987 | Shinozaki et al. | 180/68.1 X |
| 4,653,762 | 3/1987 | Nakamura et al. | 180/219 X |
| 4,776,901 | 1/1989 | Furukawa | 180/219 X |
| 4,799,569 | 1/1989 | Hattori et al. | 180/68.3 X |
| 4,881,614 | 11/1989 | Hashi et al. | 180/225 |

FOREIGN PATENT DOCUMENTS 261731 12/1985 Japan ............................. 180/229

Primary Examiner—Charles A. Marmor
Assistant Examiner—Kevin Hurley

[57] ABSTRACT

A motorcycle including a motorcycle body having a frame, front and rear wheels supported on the frame, a fuel tank, and an engine carried by the frame which is operable to receive fuel from the fuel tank and provides driving power for at least one of the wheels. An air exhaust facilitating, fuel tank and radiator shroud combination is provided to deflect radiator exhaust air laterally outwardly.

6 Claims, 8 Drawing Sheets

MOTORCYCLE FUEL TANK PROVIDING MULTIPLE ENHANCEMENTS

CROSS-REFERENCES TO RELATED APPLICATIONS

Priority is claimed, pursuant to the Paris Convention, with respect to the following priority applications:

Japanese Utility Model Application Serial No. 077,130/1988 (Yasuyuki Tsurumi and Mamoru Isomura), Filed Jun. 10, 1988;

Japanese Utility Model Application Serial No. 101,778/1988 (Yasuyuki Tsurumi and Mamoru Isomura), Filed Jul. 29, 1988;

Japanese Utility Model Application Serial No. 150,501/1988 (Yasuyuki Tsurumi ), Filed Nov. 18, 1988.

BACKGROUND OF THE INVENTION

1. Field of the Invention

This invention relates to motorcycle vehicle fuel tank arrangements. Specifically, it relates to fuel tank characteristics intended to enhance multiple operating characteristics of a motorcycle including weight distribution, air flow control, component mounting, etc.

2. Description of the Related Art

In the ensuing discussion of preferred embodiments, individual considerations, in relation to prior efforts in the field of the invention, will be considered in the context of each major enhancement provided by the invention.

For the present, suffice it to note the following delineation of considered prior art with respect to these enhancements:

Shock Absorber Straddling Fuel Tank Means
Japanese Published Application 58-73435 (No. 73435/1983)
Air Exhaust Facilitating Fuel Tank Means
Japanese Utility Model Application 61-15630/1986 (No. 15630/1986)
Rear Frame Mounting Enhancing Fuel Tank Means
Japanese Published Application 15086/1982
Japanese Published Utility Model Application 109883/1986
Load Distribution Enhancing Fuel Tank Means
Japanese Published Patent Application 157974/1985
Japanese Published Patent Application 92974/1986

In addition, this invention is presented in the context of general awareness of the overall body of art in the field of motorcycle fuel tank arrangements, this body of art embracing U.S. Pat. Nos. such as:

Morioka et al U.S. Pat. No. 3,926,274 (1975)
Yamaguchi U.S. Pat. No. 4,469,190 (Sep. 4, 1984)
Nomura U.S. Pat. No. 4,577,719 (Mar. 25, 1986)
Williams, Jr. U.S. Pat. No. 4,588,196 (May 13, 1986)

SUMMARY OF THE INVENTION

This invention pertains to a motorcycle including:
a motorcycle body having frame means;
front and rear wheel means supported on the frame means;
a fuel tank; and
engine means carried by the frame means, operable to receive fuel from the fuel tank means, and providing driving power for at least one of the wheel means.

The improvements present through the invention comprise at least one of:
shock absorber straddling, fuel tank means;
an air exhaust facilitating fuel tank means;
rear frame mounting enhancing; fuel tank means; or
load distribution enhancing, fuel tank means.

The aforesaid shock absorber straddling, fuel tank means comprises:
a main frame included in the frame means and extending generally in front and rear directions of the motorcycle body;
a center frame included in the frame means and extending and generally in up and down directions of a rear portion of the main frame;
a rear swing arm pivotably mounted on the center frame;
a rear, shock absorbing unit connected between the swing arm and the rear portion of the main frame; and
the fuel tank being mounted with portions thereof disposed to straddle the rear shock absorbing unit in a manner to provide
fuel tank portions extending in front and rear directions from the shock absorbing unit.

The aforesaid air exhaust facilitating, fuel tank means comprises:
a motorcycle radiator;
a rear portion of a shroud covering an outside portion of the radiator, which rear portion at least partially overlaps and is connected to an outside surface of the fuel tank; and
an air exhaust port formed at a connecting location between the radiator and an outside, fuel tank surface;
the radiator being disposed laterally of a cylinder of an engine associated with the radiator;
the fuel tank being arranged generally rearwardly of the radiator and disposed generally intermediate of a generally lower location of a vehicle seat and a generally upper location of an engine carburetor;
a tapering fuel tank portion being formed to extend and expand rearwardly from the location at which said fuel tank and said shroud overlap each other; and
the air exhaust port being formed between the tapering fuel tank portion and the shroud.

This air exhaust facilitating, fuel tank structure device for a vehicle radiator may further include:
an upper cover provided generally above the shroud; and
an intake chamber formed inside the upper cover;
the shroud cooperating with the upper cover to define an air cleaner inlet for the engine segregated from the radiator.

The said frame mounting enhancing, fuel tank means comprises:
a pair of right and left rear frame members of the frame means reinforced by
a cross-member extending transversely of the longitudinal direction of the rear frame members;
the rear frame members being detachably connected to a front frame of the frame means which supports
a rear wheel,
a front wheel,
and an engine;
the fuel tank for the motorcycle being disposed adjacent connecting juncture means between the rear frame members and the front frame; and the fuel tank including
generally longitudinally extending groove means provided by side walls of the fuel tank and operable to receive the rear frame members, and
a fitting stay for vertically securing the cross-member and provided at a rear wall portion of the fuel tank,
the fuel tank being mounted on the front frame, with the rear frame members being directly connected to the front frame but laterally spaced by a distance less than the width of the fuel tank.

The load distribution enhancing fuel tank means comprises:
a main frame of the frame means including
a generally tubular, handle bar socket means at the front end portion thereof,
and a rear portion;
a rear swinging arm;
a centerframe which
connects to the main frame rear portion,
extends generally downwardly, and
provides a pivot portion for pivotally mounting the front end portion of the rear swing arm;
a seat rail extending rearwardly from the main frame rear portion to support a seat; and
the fuel tank including
right and left depending portions
supported by the main frame,
extending generally rearwardly of an engine cylinder, and
being located generally above an engine crankcase,
an upper communicating portion providing communication between the upper portions of the right and left depending portions, and
flat summit wall means of the connecting portion extending from the seat rail to the main frame across said center frame.

With the invention having been summarized, it is now appropriate to give consideration to presently preferred embodiments of the invention.

By way of example only, and not by way of limitation, reference will be made to illustrations of the presently preferred embodiments as set forth in the appended drawings.

BRIEF DESCRIPTION OF THE DRAWINGS

In the appended drawings,

In these drawings:

FIG. 1 is a side view of a motorcycle, with portions shown "cut away" to expose interior details, this view showing basic parts of a vehicle body of the motorcycle;

FIG. 2 is a perspective view of the FIG. 1 cycle showing the vehicle body of FIG. 1;

FIG. 3 is a transverse, elevational view of the FIG. 1 cycle showing the vehicle body from its rear;

FIG. 4 is an enlarged, fragmentary side view of the FIG. 1 cycle showing an air cleaner and the motorcycle main frame partially cut away;

FIG. 5 is a perspective view of the FIG. 1 cycle showing the fuel tank of the FIG. 1 motorcycle;

FIG. 6 is a side view showing an outline of a motorcycle, with portions cut away to expose interior details;

FIG. 7 is a side view of the FIG. 6 cycle, partially cut away to show basic parts of the vehicle body;

FIG. 8 is a perspective view of the FIG. 6 cycle showing a vehicle body frame;

FIG. 9 is a transverse elevational view of the FIG. 6 cycle showing the vehicle body frame as seen from its rear;

FIG. 10 is a perspective view of a fuel tank of the FIG. 6 cycle;

FIG. 11 is an enlarged, fragmentary side view of the FIG. 6 cycle showing an air cleaner and a main frame partially cut away;

FIG. 12 is a fragmentary, cut away plan view showing air exhaust flow detail as seen from the arrow direction X of FIG. 6;

FIG. 13 is an enlarged, cross sectional, generally vertical view of a flow passage and air flow segregation feature of the FIG. 6 cycle;

FIG. 14 provides a fragmentary side elevational view of a motorcycle;

FIG. 15 illustrates, in exploded perspective format, the integrated rear frame, fuel tank, and front frame of the FIG. 14 cycle; and FIG. 16 provides an enlarged, fragmentary, vertically sectioned view of the FIG. 15 arrangement, when assembled.

With the illustration context of the invention having been set forth, it is now appropriate to proceed with a detailed description of the presently preferred embodiments.

DESCRIPTION OF THE PREFERRED EMBODIMENTS

1. Shock Absorber Straddling, Fuel Tank Means

This aspect of the invention relates to a fuel tank for motorcycle which uniquely and advantageously straddles a shock absorber.

Prior Art Considerations

A conventional motorcycle comprises a main frame including front and rear portions. A center frame extends in up and down directions of a rear portion of the main frame. A rear swing arm is pivotably mounted on the center frame and a rear shock absorbing unit is connected between the swing arm and the rear portion of the main frame. A fuel tank is adapted to be mounted on the main frame (For example, see published Japanese Patent Publication No. 58-73435 (No. 73435/1983).

Also, in this prior art example, an independent sub-tank is arranged at the rear portion of the main frame and is disposed in communication with the main tank on the main frame.

Disadvantage To Be Solved By Present Aspect Of The Invention

Since the weight varies according to the fuel consumption, the fuel tank is generally preferable to be arranged as near as possible to the center of gravity of the vehicle body. However, because the rear shock absorber unit is disposed near the center of gravity of the vehicle body, space is limited at the rear of the rear shock absorber unit. Therefore, at this location, only a relatively small volume fuel tank means may be provided.

Therefore, it is an object of the present invention to provide a fuel tank which can be arranged as near as possible to the center of gravity of a motorcycle body, in spite of the presence of a normally, space obstructing rear shock absorbing unit.

Present Invention Means For Solving The Prior Art Disadvantage

In order to solve the aforesaid disadvantage, the fuel tank relating to the present invention is characterized in that the fuel tank is mounted so as to straddle the rear shock absorbing unit in a manner placing fuel tank portions in both front and rear directions of the shock absorber.

Since the fuel tank of the present invention is mounted so as to straddle the rear shock absorbing unit in front and rear directions, the fuel tank is able to be positioned near the center of gravity of the vehicle body, and the concentration of weight becomes desirably large at the center of gravity of the vehicle body.

PREFERRED EMBODIMENT

The following description will be made with reference to one embodiment of the present invention, discussed with reference to FIGS. 1-5 of the drawings.

Figure 1:
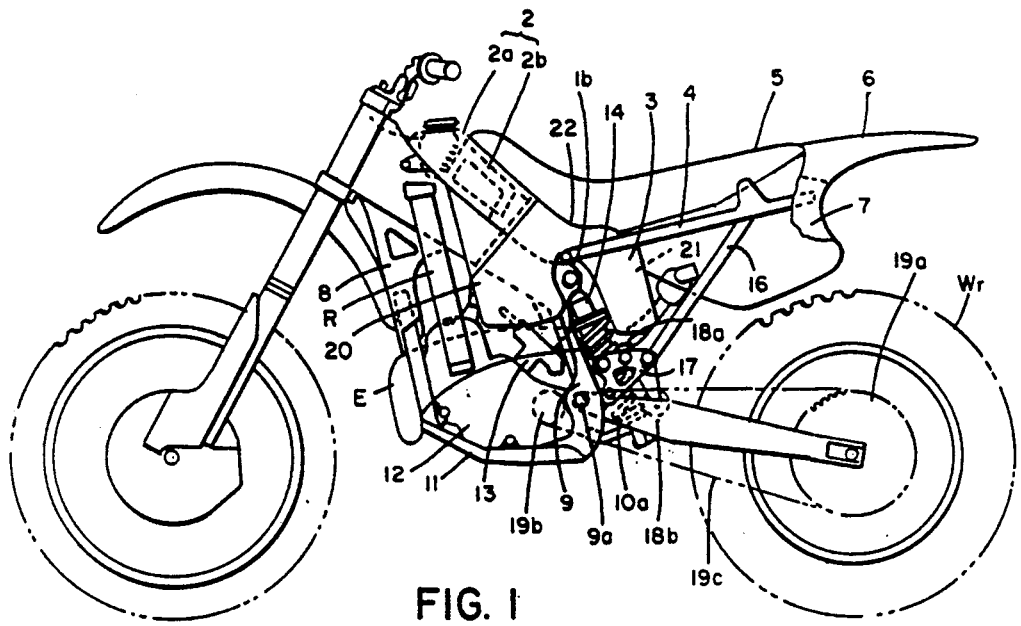
FIGS. 1–5 illustrate shock absorber straddling aspects of the fuel tank invention.
Figure 2:
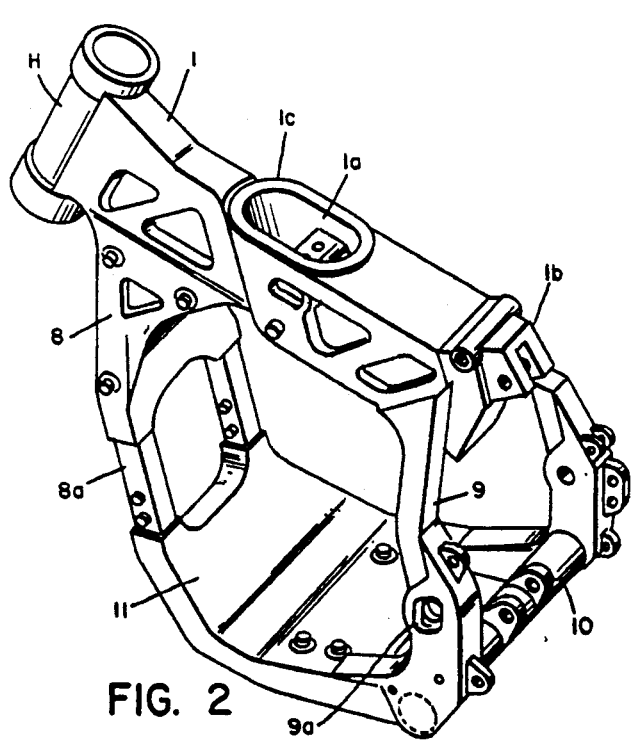
Figure 3:
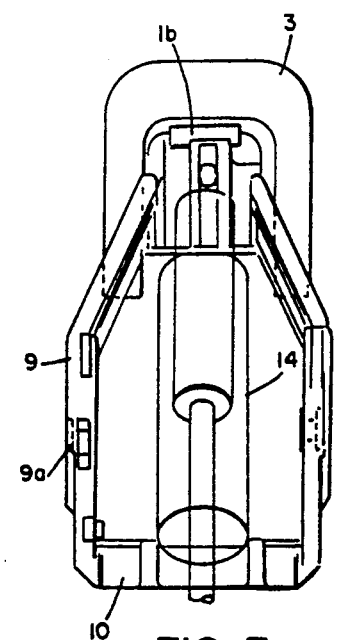

FIG. 1 shows a side view illustrating basic parts of a body of a motorcycle. FIG. 2 is a perspective view of this vehicle's body frame, and FIG. 3 is a view showing the shape of a rear portion of the vehicle body frame. As shown in FIG. 1, this embodiment has being applied to an off-road type of motorcycle.

A main frame 1 of the motorcycle consists of a rectangular cross sectioned pipe which extends in front and rear directions from a front center portion of the vehicle body. This frame pipe is adapted to constitute an air duct to connect with an air cleaner 2.

A fuel tank 3 is supported on the main frame 1 and a seat 5 is mounted on a seat rail 4 which is provided at a rear portion of the main frame 1. Further, the cycle includes a rear fender 6, and a rear side cover 7. Reference numeral 2a shows an air cleaner cover constituting a cover for the air cleaner 2. A tank cap 3a is detachably mounted on a supply port communicating with the fuel tank.

The main frame 1 is provided with a tubular handle bar socket "H" or head pipe at a front end thereof.

In an upper surface of the main frame 1 there is formed an eliptical intake opening 1a near the pipe "H", as shown in FIG. 2. The main frame 1 has a portion of relatively narrow width between the pipe "H" and the intake opening 1a. On both sides of this narrow portion is arranged a radiator "R" and an exhaust pipe "E". On the one hand, the rear portion from the intake opening 1a of the main frame 1 has a relatively wide width, this portion affording a large volume intake for clean air passing into the interior passage thereof, leading to the engine air intake.

Upper ends of a pair of left and right, downwardly extending frame portions 8 are connected to a front side of the main frame 1, and a pair of left and right pivot plates 9 are successively arranged at a rear side of main frame 1. A cross pipe 10 is arranged to extend transversely between lower portions of the plates 9, as shown in FIG. 2 and FIG. 3.

At a lower end of each of the tubular frame members 8 there is mounted, through the intermediate association of a joint pipe 8a, a front end of a lower frame 11. A rear portion of the frame 11 is mounted on the cross pipe 10.

An engine 12 is carried on the lower frame 11. An intake side of the engine 12 communicates with a rear inside of the hollow, air supplying main frame 1 through the intermediary of a carburetor 13.

A rear shock absorber or cushioning unit 14 is mounted between a boss 1b provided on a rear upper portion of the main frame 1 and a link member 10a having a pivot point on the cross pipe 10. Also, a front end of rear swing arm 15 is pivotably mounted on a pivot portion 9a formed on a lower portion of the pivot plate 9. A rear wheel Wr is rotatably supported on a rear end of the rear swing arm 15.

Further, on the pivot plate 9 there is mounted a rear stay 6 by way of a bracket 17 on which idle rollers 18a and 18b, for adjusting anti-squat forces, are supported on shafts. In FIG. 1, reference numerals show a driven sprocket at 19a, a drive sprocket at 19b and a drive chain at 19c.

A description of the shock absorber straddling fuel tank will now be undertaken in detail.

Figure 4:
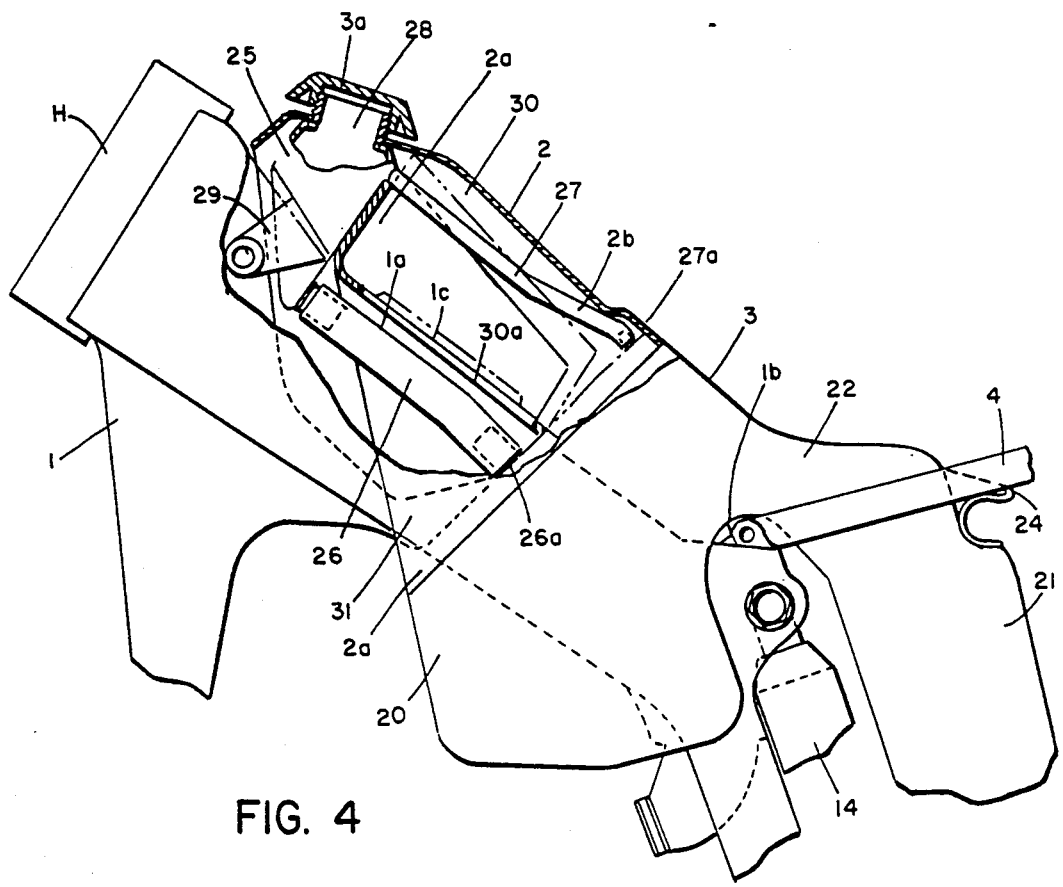
Figure 5:
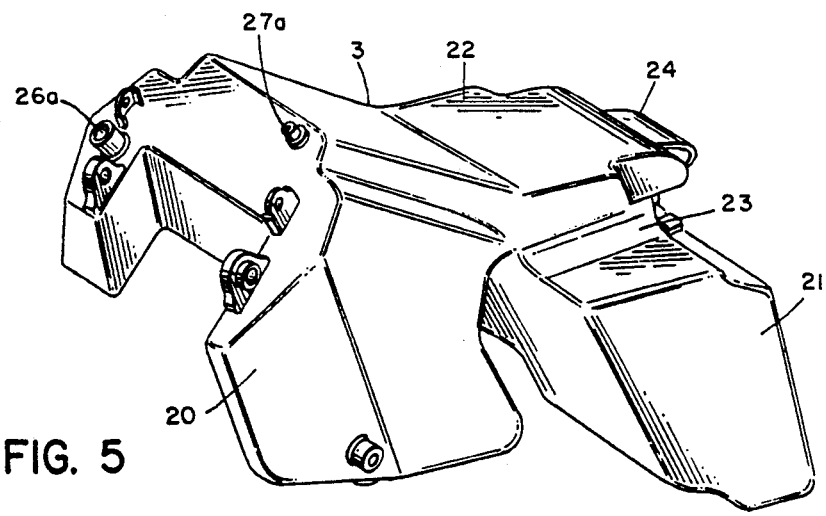

As shown in FIGS. 4 and 5, the fuel tank 3 consists of a front, laterally bifurcated, chamber 20 and a rear chamber 21. These chambers straddle the rear shock absorber unit 14 in a way so as to position main tank portions forwardly and rearwardly of the shock unit 14. Chambers 20 and 21 are adapted to communicate through a connecting portion 22 located above the rear shock unit 4. Also, as is shown in FIG. 3, the front chamber 20 of the fuel tank 3, in being laterally bifurcated, is disposed to laterally straddle in a saddle-like fashion, the main frame 1 and provide portions on left and right sides. The rear chamber 21 is inserted between the left and right seat rails 4 to which the rear chamber 21 is secured at side groove or recess portions 23 formed on both sides thereof. Reference numeral 24 shows a rear stay of the tank.

In the air cleaner cover 2a, near the tubular pipe "H", there is provided a small volume, fuel receiving sub tank 25 together with an air cleaner element 2b. The bottom of tank 25 communicates with the front chamber 20 by means of a fuel hose 26 and main tank nipple 26a.

An air breathing hose 27 is provided to connect between the front upper portion of the fuel tank connecting portion 22 and a rear upper portion of the sub-tank 25.

In FIGS. 4 and 5, reference numerals 26a and 27a show ports for connecting the hoses. Reference numeral 28 shows a filler port which is provided on the sub-tank 25 and which projects from the air cleaner cover 2a. A tank cap 3a is mounted on this filler port 28. Also, reference numeral 29 shows a stay for fixing tank 25 to the main frame 1. Reference numeral 30 shows a partition plate which is provided to partition the air cleaner element 2b from the sub-tank 25. The partition plate 30 is clamped together with the air cleaner element 2b above the intake opening 1a. This is accomplished by fitting an opening portion 30a, formed on a flat base portion of the partition plate 30, around a periphery of a protruding edge 1c which is formed a peripheral edge of the opening portion of the intake opening 1a. This edge 1c projects upwardly of the main frame 1 into the bottom of an air cleaner element 2b which, in effect, covers the top of the opening 1a with air filler means. Also, a side surface of the partition plate 30 covers partially a side surface of the main frame 1, and at its lower end 31 is connected to the fuel tank 3 by overlapping on a step 20a formed on an upper, forward facing portion of the front chamber 20. In connection with this overall arrangement, see FIGS. 12 and 13.

With the fuel tank so constructed, it can be uniquely arranged near the center of gravity of the vehicle body, independent of the presence of the rear shock absorber unit 14.

Further, in this embodiment, since the filler port 28 is provided near the front pipe "H", it is convenient to fill the tank with fuel, even if the fuel tank 3 is provided below the seat 5.

Beneficial Effect Of The Invention

According to the present invention, since the fuel tank can be disposed to accomodate the position of the rear shock absorber unit, this makes it possible arrange the fuel tank near the center of gravity of the vehicle body, whereby it is possible to assist in concentrating the fuel weight at or near the center of gravity of the vehicle body.

2. Air Exhaust Facilitating, Fuel Tank Means

This aspect of the invention relates to aspects of the fuel tank which enhance the flow of air exhausting from the cycle radiator.

Prior Art Considerations

In a conventional motorcycle, a radiator is provided in front of a cylinder of an engine, and a shroud is provided to cover an outside of the radiator. A rear portion of the shroud is bent obliquely upwardly so as to connect and fix the shroud to an outside surface of a fuel tank which is positioned rearwardly of the radiator and above a seat. A wind exhaust port is formed to a rear side portion of the shroud. Also, a carburetor is arranged below the fuel tank and to the rear of the radiator (see, for example, published Japanese Utility Model Publication No. 61-15630/1986)).

In a case such as a prior art vehicle as described above, it is difficult to design the vehicle so as to accommodate a desired concentration of mass. For accommodating a desired concentration of mass, it is needed to displace a portion of the radiator rearwardly and downwardly. However, since the radiator is now made to be close to the carburetor, there is a concern as to how to deal with the thermal affects of the radiator while attending to the filling efficiency of the engine air intake.

PRESENT INVENTION

Therefore, it is an object of the present invention to provide an air exhaust device for a motorcycle radiator which can improve the filling efficiency of the engine air intake while avoiding the adverse thermal affects of the carburetor, and, as a possible adjunct, to provide an air exhaust device for radiator which is adapted to segregate from the engine air intake the hot air exhaust from the radiator.

MEANS FOR SOLVING THE SUBJECT

In order to solve the subject mentioned above, an air exhaust device for a radiator according to the present invention is characterized in that a radiator is provided laterally of a cylinder of an engine, that a fuel tank is arranged rearwardly of said radiator, generally between a lower portion of a seat and an upper position of a carburetor. A tapering fuel tank portion is formed to expand rearwardly at a location at which the fuel tank and a radiator shroud overlap each other. An air exhaust port is formed between the tapering fuel tank portion and the shroud.

Also, an upper cover may be provided above the shroud, with an intake chamber being formed inside the upper cover which is segregated from said radiator.

EFFECT OF THE INVENTION

When the radiator is provided laterally of the cylinder of the engine and the fuel tank is arranged generally intermediate the lower portion of the seat and the upper portion of the engine carburator to the rear of the radiator, the mass concentrates at the position of the center of gravity on the vehicle body. Moreover, since the portion of the fuel tank overlapping with the rear portion of the shroud is the tapering portion, the hot air from the radiator is rapidly deflected away from the vehicle body along the tapering portion of the fuel tank, generally forward of the carburetor. Further, when the air filler intake chamber is defined in an upper cover above the radiator shroud, it makes it possible to easily segregate the hot air flowing out of the radiator from the inside of the filler chamber, and to thus readily prevent an increasing intake temperature.

DETAILED DESCRIPTION

The following description will be made of one embodiment of the present invention with reference to FIGS. 6-13 of the drawings. This embodiment has being applied to an off road motorcycle.

As will be noted, FIGS. 6-13 illustrate essentially the motorcycle of FIGS. 1-5, with disclosure emphases being placed on radiator air exhaust flow control as depicted in FIGS. 2 and 11-13. Accordingly, the prior discussion of elements as described in relation to FIGS. 1-5 is herein incorporated by reference as to the embodiment of FIGS. 6-13.

Figure 7:
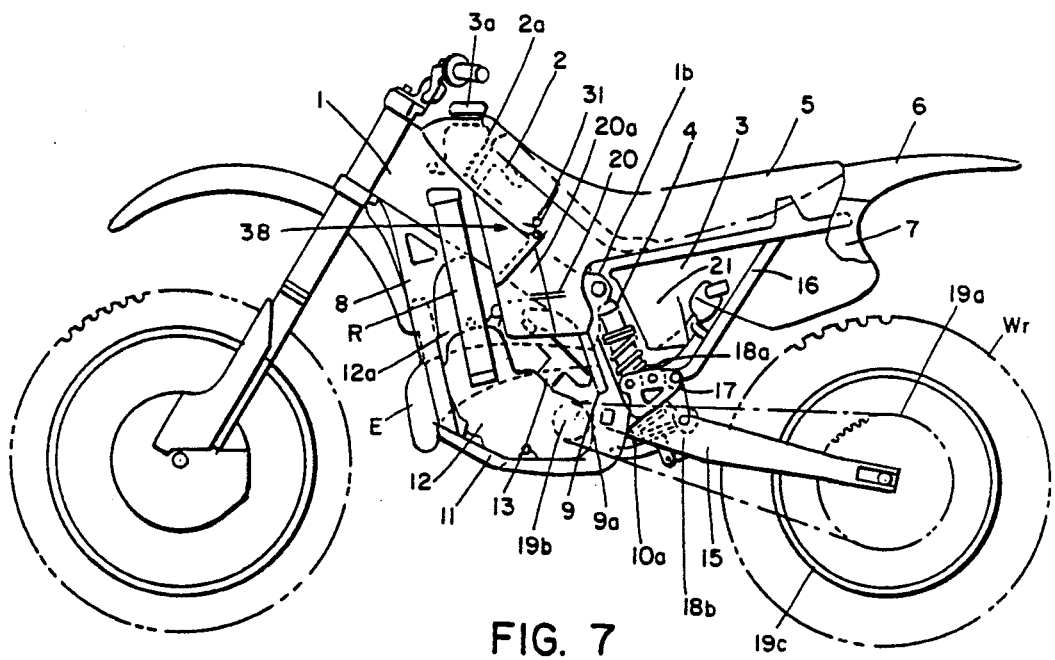
Figure 8:
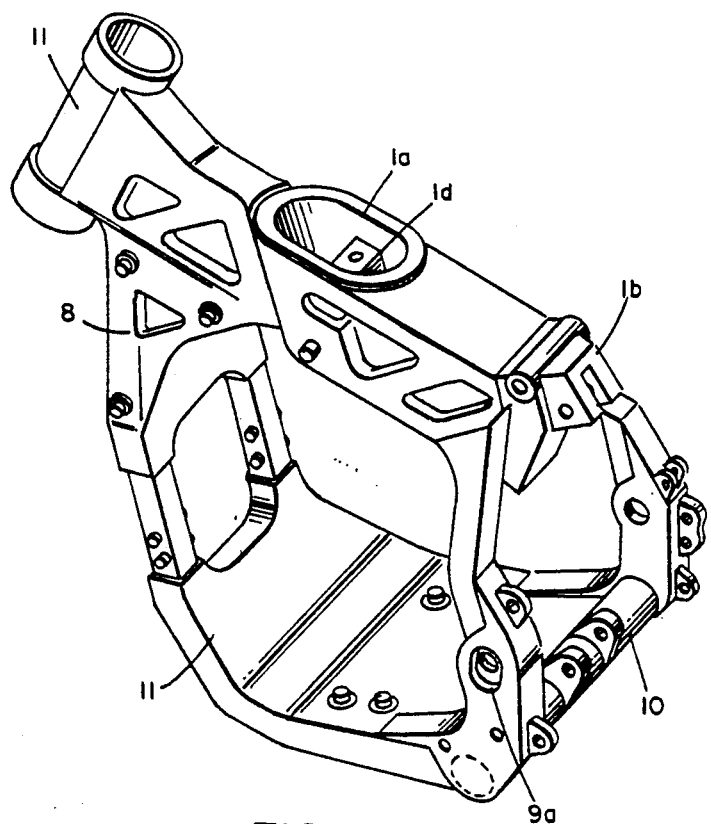
Figure 9:
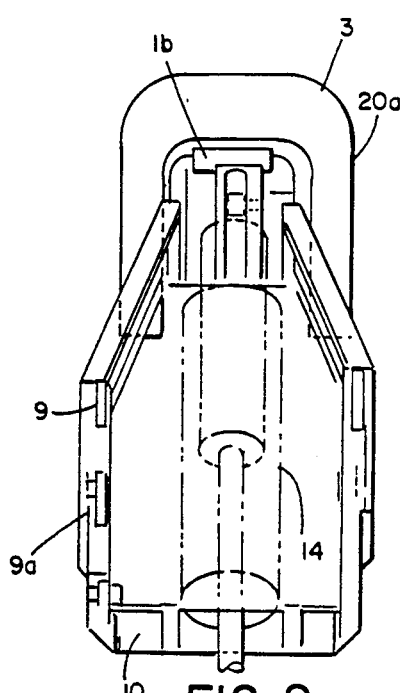
Figure 10:
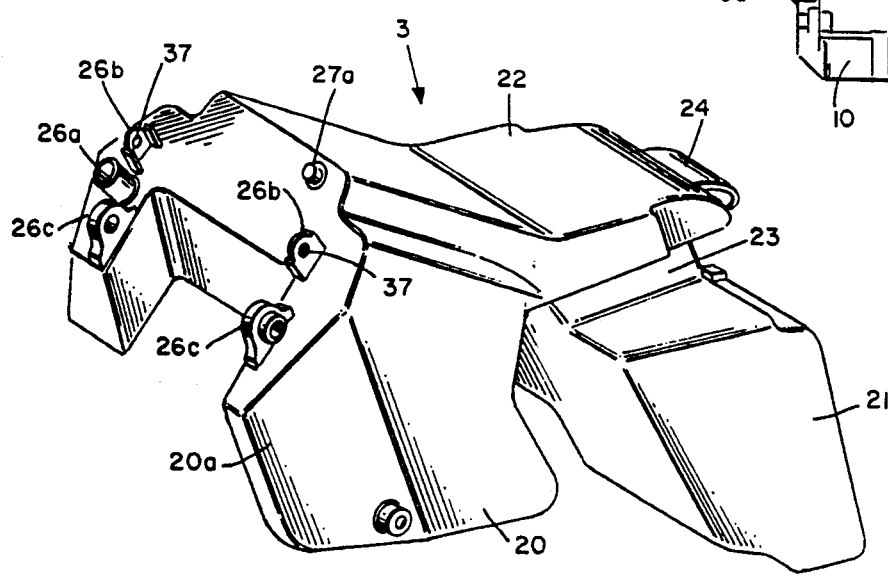

As shown in FIG. 7, an engine 12 is carried on the lower frame 11, and the radiator "R" is obliquely supported between a cylinder 12a of the engine 12 and a front outside surface of the main frame 1. In view of the fact that the radiator "R" is arranged somewhat rearward of the outside forward surface of the cylinder 12a, it is possible to arrange the relatively weighty radiator "R" close to a center of gravity of the vehicle body, thus contributing to the desired concentration of mass.

Figure 11:
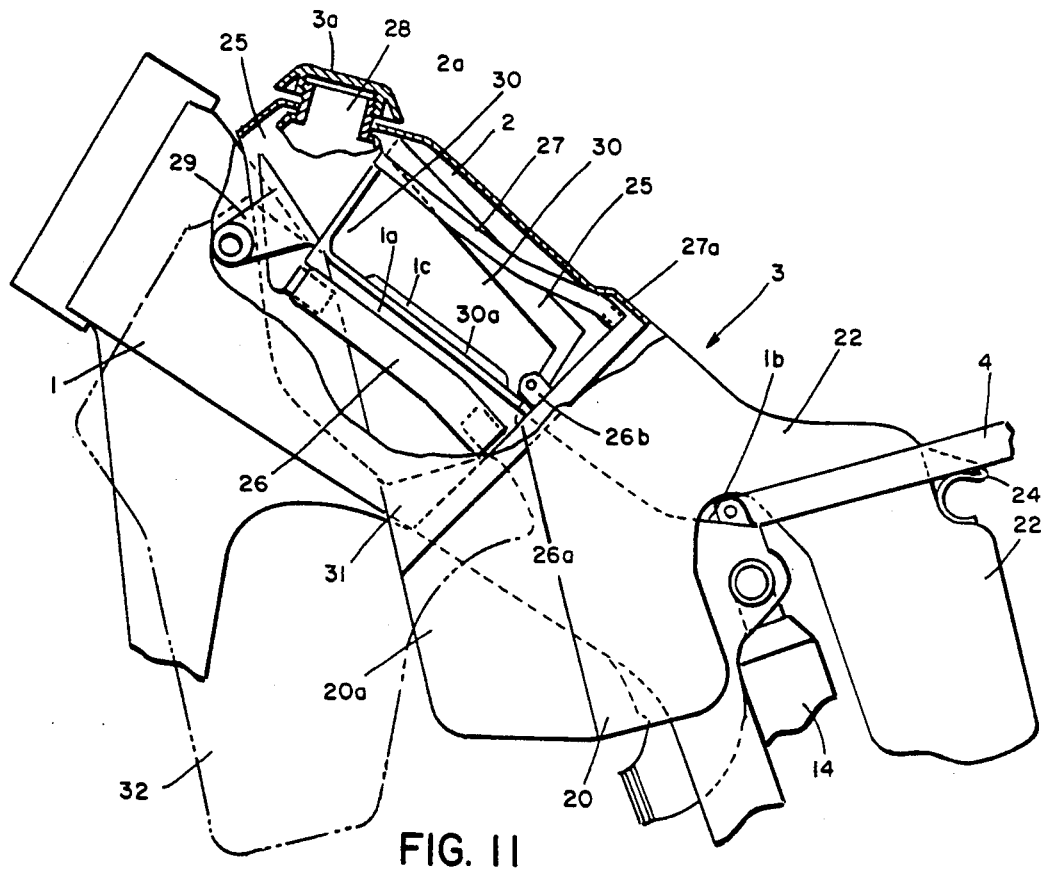
Figure 12:
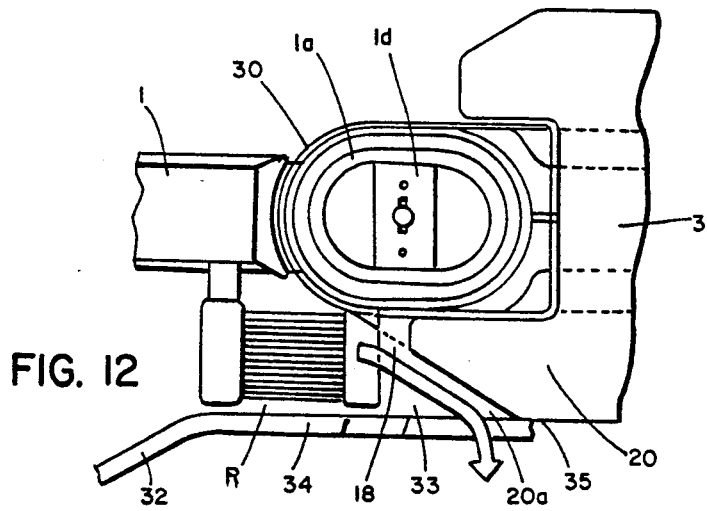

In FIGS. 11 and 12, as earlier noted with respect to the FIG. 1-5 drawings, the partition plate 30 is clamped together with the air cleaner element 2b above the intake opening 1a. This results from fitting an opening portion 30a around a periphery of a protruding edge 1c which is formed on a peripheral edge of the opening portion of the intake opening 1a. The wall around opening 30(a) is clamped between the main frame 1 and the bottom of the air cleaner element 2b.

As shown in FIG. 11, a substantially triangular partition wall 31 extends integrally from the bottom of the partition plate 30 to a left side surface of the main frame 1. The rear oblique side of plate 31 is connected to the fuel tank 3 in a condition which is overlapped with and outside of a leading, tapering end portion 20a of the front chamber 20. (See FIG. 12).

Outside the partition wall 31 there is provided a shroud 32 which is adapted to function as a front side cover. The shroud 32, as shown in FIG. 6, is connected to the air cleaner cover 2a at an upper end thereof and at its rear end is connected to the front portion of the fuel tank 3, thereby to cover an outside surface of the radiator "R".

Figure 6:
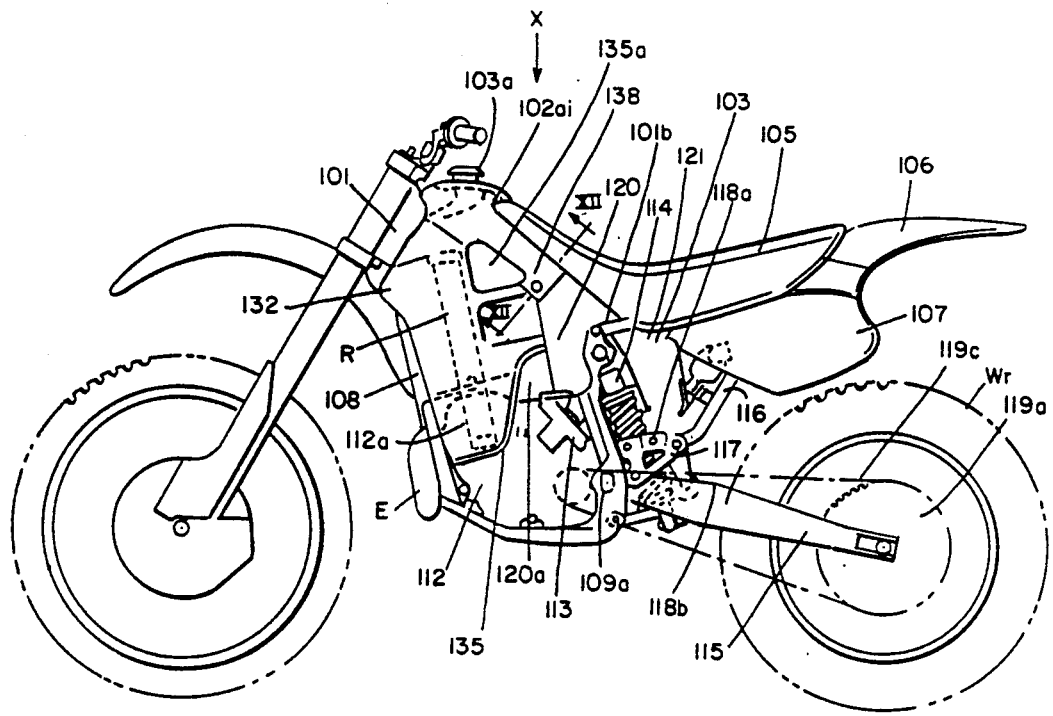
FIGS. 6–13 illustrate air exhaust facilitating aspects of the fuel tank invention.

FIG. 12 affords a view seen in an arrow direction "X" of FIG. 6 in order to indicate a relation between the shroud 32, the radiator "R" and the fuel tank 3, by "cutting away" view obstructing parts mounted on the main frame 1. The rear portion of the shroud 32, as shown in FIGS. 6 and 12, shows its overlapping relation with the tapering portion 20a of the fuel tank 3. That is, the shroud 32 is designed to overlap on the outside of the front chamber 20 of the fuel tank 3 arranged on both side surface of the main frame 1. Since a gap exists between the shroud 32 and the tapering portion 20a, an air flow exhaust path 33 is produced, as shown in FIG. 12. The latter communicates with a radiator chamber 34 which is a cavity provided inside the shroud 32 so as to contain the radiator "R".

A rear portion of the air exhaust path 33 forms an air exhaust port 35, opening rearwardly. The air which enters into the radiator chamber 34, as shown by arrows in FIGS. 12 and 13, from the front of the vehicle body during its running, flows rearward as a hot air flow after cooling the radiator "R". This hot air flow is exhausted from the wind exhaust port 35 through the exhaust path 33 and flows then to the outside of the vehicle body. At this time, since the air exhaust path 33 extends along the tapering surface of the rearwardly expanding fuel tank portion 20a, the hot wind is guided and deflected by the tapering portion 20a and flows out quickly laterally and rearwardly of the vehicle body. In this manner, the hot exhaust air flows diverted away from the carburetor 13, even though the radiator "R" is positioned close to the carburetor 13 (see FIG. 7). Consequently, even if the radiator "R" and the carburetor 13 are arranged relatively close to each other, thermal affects to the carburetor 13 become minimal so as to enhance the efficiency of the carburetor operation.

Also, since this wind exhaust path 33 utilizes the tapering portion 20a of the front chamber 20 of the fuel tank, it can provide a relatively large opening surface. Since the path does not affect to the outline of the shroud, it is capable of being easily formed.

Figure 13:
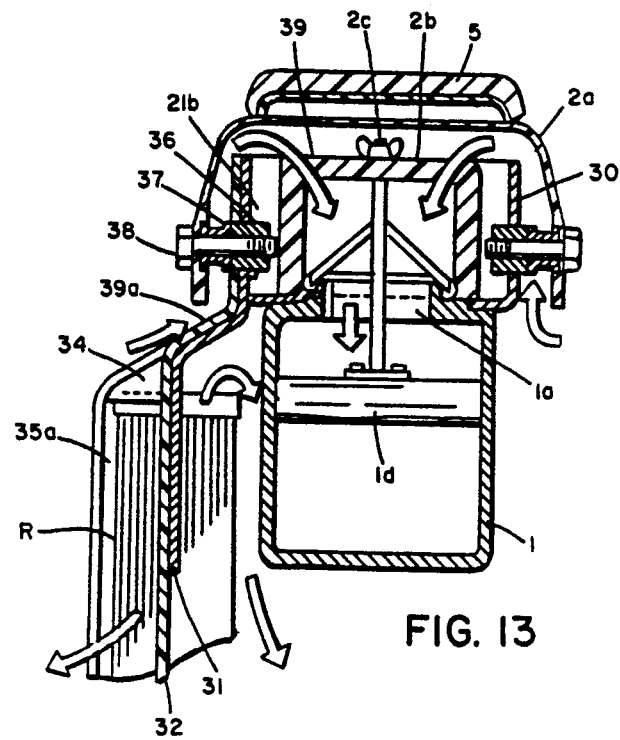

Further, another portion of the shroud 32 may be formed with a wind exhaust port 35a as in the prior art (see FIG. 13).

FIG. 13 shows the structure of a connecting zone between the shroud 32 and the air cleaner cover 2a. On the stay 26 shown in FIG. 10, there is provided a welded-in-place nut 36 on which the side surface of the partition plate 30 is fitted. On the laterally protruding end of the weld nut 36 there abuts the protruding inside end of a collar 37 which is inserted through the shroud 32 inside of the air cleaner cover 2a. In such a manner, the air cleaner cover 2a, the shroud 32 and the partition plate 30 may clamped integrally via fastening nut 38. At this time, the radiator chamber 34 is defined inside the shroud 32 by the partition plate 30 and an intake chamber 39 is defined inside the air cleaner cover 2a.

The air intake chamber 39 communicates with an external, air intake opening 39a. Cooled outside air is introduced into the intake chamber 39 via inlet 39a so as to substantially avoid the thermal affects of the radiator "R". This makes it possible to introduce cool air into the duct which is constituted by the inside cavity of the main frame 1, via the air cleaner element 2b. This arrangement thus contributes to improving the filling efficiency of engine air intake.

In FIG. 13, reference numeral 2c shows a bolt for mounting the air cleaner element 2b, and reference numeral 1d shows a cross member constituting the mounting body of the bolt.

EFFECTS OF THE INVENTION

According to this aspect of the invention, by virtue of the fact that the radiator is displaced rearwardly and downwardly, and that at the same time the fuel tank is arranged below the seat, the vehicle mass can be more effectively concentrated near the center of the gravity of the vehicle body and mass criteria can be more easily designed. Also, even though the radiator is relatively close to the carburetor, since the hot air flowing from the radiator can be exhausted outside the vehicle body by efficiently utilizing the tapering portion of the fuel tank, the adverse thermal affects to the carburetor can be kept as small as possible and the filling efficiency of engine intake thus improved.

Also, since the partition is provided between the radiator side and the intake chamber, in addition to the benefits already noted, it becomes possible to eliminate the adverse thermal affects to the filler intake chamber, and the filling efficiency of this intake can be improved.

3. Rear Frame Motoring Enhancing Fuel Tank Means

This aspect of the invention relates to a fuel tank for a motorcycle which uniquely enhances the mounting of a rear frame.

OBJECT OF INVENTION

An object of the present invention is to present a fuel tank for a motorcycle in which the mounting of the rear frame can be done at the same time as the fitting of the fuel tank.

In order to achieve this objective, a fuel tank for a motorcycle, according to the present invention, is disposed adjacent the connecting portion joining the rear frame to the front frame. A fitting groove means for the rear frame and a fitting stay for the rear frame crossmember are respectively provided on the side walls and the rear wall of the fuel tank. In this manner, the fuel tank can be mounted to the front frame at the same time as when the rear frame is mounted to the front frame.

Prior Art Considerations

It is generally known from prior art such as Japanese patent application No. 15086/1982 and Japanese Utility Model Application No. 109883/1986, that a pair of right and left rear frame members, extending in longitudinal frame direction and reinforced by cross-members, may be detachably mounted to a front frame upon which is mounted a front wheel, a rear wheel, and an engine. In this prior art, the rear frame and the fuel tank are respectively mounted to the front frame independently.

As the assembly work of the rear frame and the fuel tank must be separately done, according to the above-described construction, there are required many fitting parts. Such complications are not considered to be good from a productivity standpoint or as to ease of assembly or detachment for service. Thus, it is an object of the present invention to present a fuel tank for a motorcycle in which the mounting of the rear frame and the fuel tank may be accomplished at the same time.

Functional Aspects of the Invention

As the rear frame is fitted to the groove means formed in the fuel tank side walls and as a rear frame cross-member is secured by a fitting element made in the fuel tank back wall, the fuel tank is installed to the front frame at the same time as the rear frame is connected to the front frame.

PREFERRED EMBODIMENT

Figure 14:
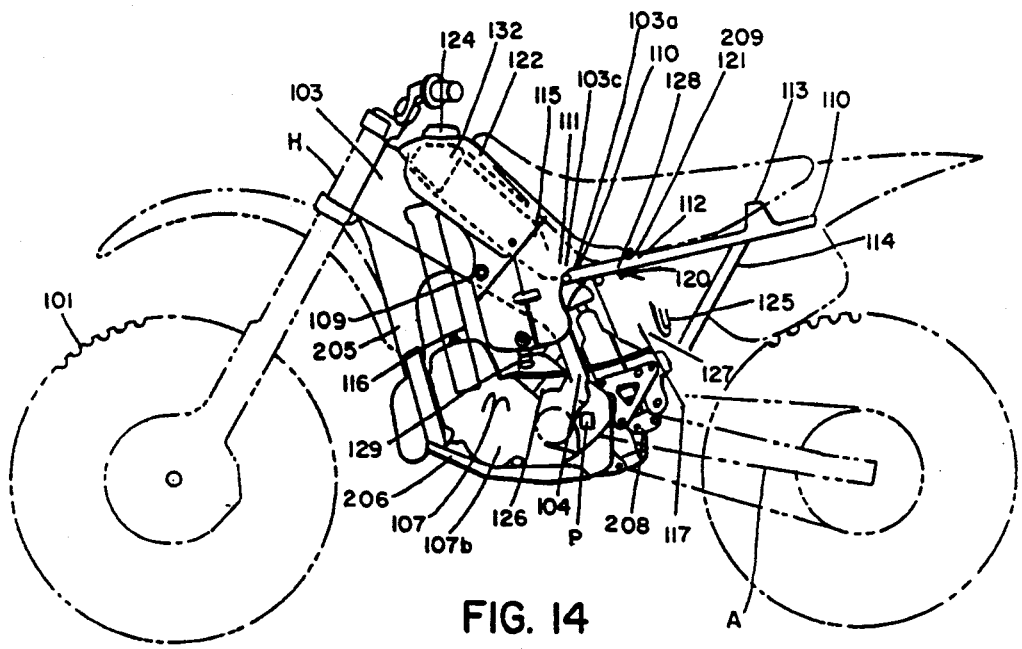
FIGS. 14–16 illustrate rear frame mounting enhancing and load distribution enhancing aspects of the invention.
Figure 15:
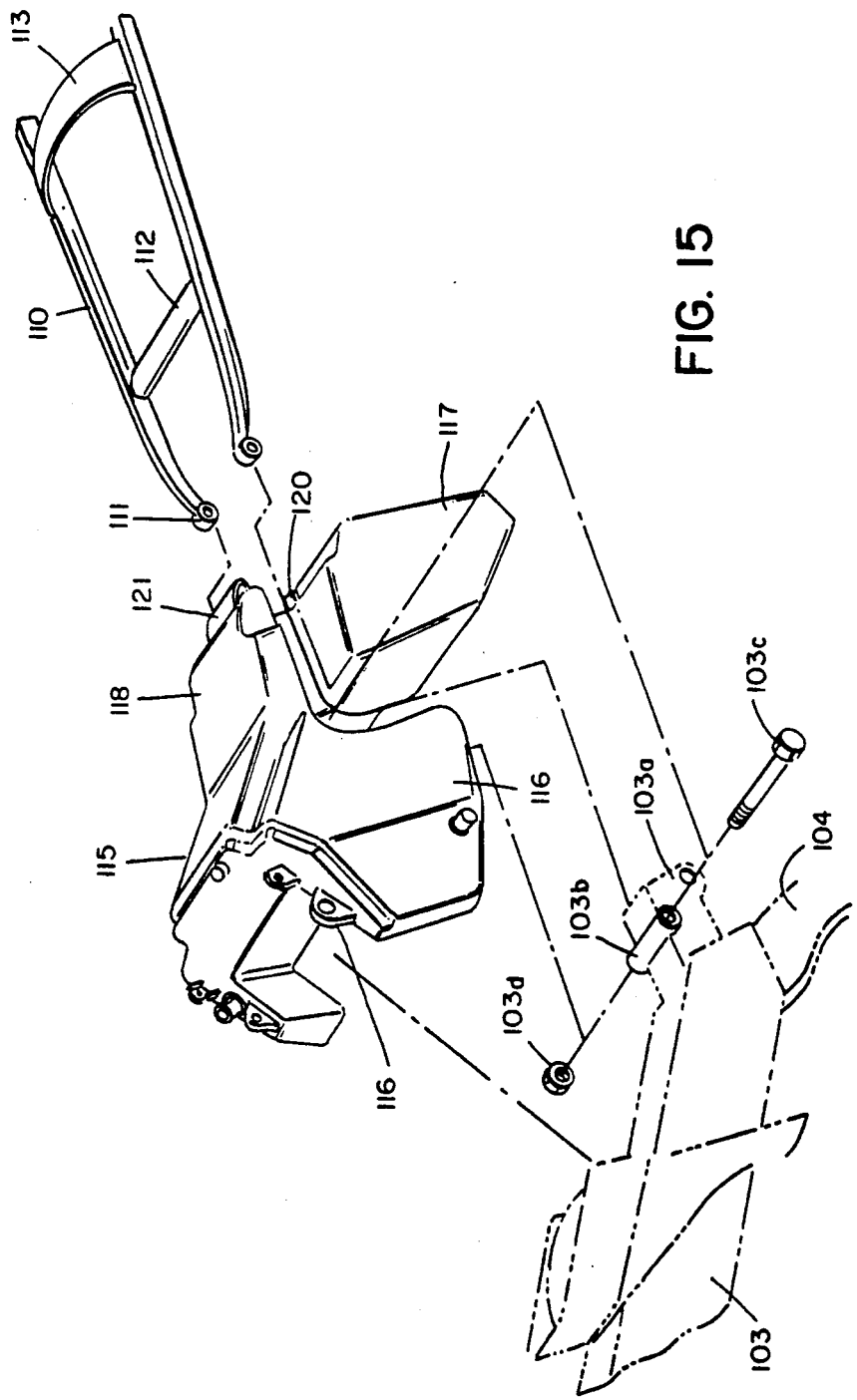

FIG. 14 and FIG. 15 show one embodiment according to the present invention.

FIG. 14 is a side view of a motorcycle, while FIG. 15 shows a mounting arrangement for a fuel tank and a seat rail that are connected with a front frame.

Numerals 101 and 102 in the drawing are a front wheel and a rear wheel which are respectively mounted on a front frame, together with an engine 7. The front frame is constituted by a main frame 103, a center frame 104, a downwardly extending frame 105, and a lower plate 106. Numeral 108 is a shock absorbing unit for a rear suspension, and numeral 109 is a seat, the rear portion of which is supported on a seat rail 110.

The seat rail 110 has a pair of right and left elements as shown in FIG. 2. A fitting portion 111 is provided at the front end portion of each such element and is connected to a transverse pipe element 103b by means of a bolt 103c and a nut 103d. Bolt 103c extends transversely of a projecting portion 103a extends from the rear portion of the main frame 103.

The seat rail 110 extends rearwardly, is inclining somewhat upwardly, and is reinforced by cross-members 112 and 113 respectively at the front end portion and the rear end portion of frame 110. These cross-members are disposed transversely so as to connect to the side rail elements of seat rail 110. A rear stay 114, which forms a "Truss" construction at the frame rear portion, is connected to the rear end portion of the seat rail.

The rear stay 114 is connected to the center frame 104 through bracket means and forms a rear frame component together with the seat rail 110.

The projecting portion 103a, which connects the main frame 103 to the seat rail 110, supports the top portion of the shock absorber unit 109 and is located adjacent the frame gravity center. The fuel tank 115 is mounted so as to extend across and overlap the gravity center.

The fuel tank 115 is constituted by a front chamber 116 and a rear chamber 117, which chambers are connected to each other by an upper, flat communicating portion 118. The front chamber 116 is made as a twin-boom style having right and left, depending sides. The right and the left bottom portions of the front chamber 116 are positioned higher than the bottom of the rear chamber 117.

The front end portion of the fuel tank 115 is installed to the side of the main frame 103 through the fitting portions 116a provided at the upper portion of the front chamber 116 by means of a bolt 119.

The rear of the fuel tank 115 engages the front end portion of the seat rail 110 by way of the groove 120 formed in the side walls of the rear chamber 117 along the sides of the seat rail 110 and the fitting element 121. Groove 120 has a "U" shape, in side elevation view, and includes a rear portion provided at the upper rear wall of the rear chamber 117. This rear portion of groove 120 receives the cross-member 112, resulting in the fuel tank 115 being mounted on the main frame 103 and secured by overlapping stay portion 121 of the fuel tank.

Supplying fuel to the fuel tank 115 is effected through a sub-tank 123 and a cap 124 which is housed within a cover 122 provided above the front end portion of the main frame 103. Sub-tank 123 communicates with the fuel tank 115, generally as described in relation to FIGS. 1-5. There is provided a vacuum pump 125 on the rear wall of the rear chamber 117. This vacuum pump 125 is connected to the vacuum side of the engine 107 through a hose 126. A hose 127 is connected to the inlet side of the vacuum pump 125 and communicates with the lowest portion of the rear chamber 117. A hose 128 is connected to the outlet side of the vacuum pump 125 and communicates with the front chamber 116.

The fuel in the bottom portion of the rear chamber 117 is sent to the front chamber 116 by the vacuum pump 125. Numeral 129 is a fuel cock.

The installation of the seat rail 110 and the fuel tank 115 will now be described.

At first, the fuel tank 115 is put on the main frame 103 as shown in FIG. 2. As the right and the left front chamber 116 and the rear chamber 117 are respectively depended from the upper communicating portion 118, the right and the left front chambers 116 laterally bracket the main frame 103 at both the right and left sides. The front chamber 116 and the rear chambers 116, 117 longitudinally bracket both the front and rear sides of the connection between frame 103 and frame 110. The front portion side is installed to the main frame 103 by means of the bolt 119. After the front portion of the seat rail 110 is inserted into the side wall portion of the groove 120 from the rear of the rear chamber 117, the seat rail 110 is pushed forwardly so that the rear chamber 117 is fitted to the seat rail 110 through the groove 120 and the cross-member 112 is inserted into the rear groove portion, under the fitting or stay element 121. The fitting portions 111 are thus located at both sides of the pipe portion 103b. The seat rail 110 is then connected to the main frame 103 by connecting the fitting portions 111 to the pipe portion 103b through means of the bolt 103c and the nut 103d.

At the same time, the rear chamber 117 is secured on the main frame 103 by the seat rail 110 and the cross-member 112 so that the fuel tank 115 is restricted in both the forward and the rearward directions by the cross-member 112 and the bolt 119 and also restricted as both side directions, by side portions of frame 110, resulting in the fuel tank being tightly secured to the main frame 103.

According to the present embodiment, as the fuel tank 115 is installed so as to extend across the pipe portion 103b, which is the connecting portion between the front fame and the rear frame, the fuel tank can be located adjacent the frame gravity center as close as possible.

EFFECT OF THE INVENTION

According to the present invention, the fuel tank can be installed on the front frame by only connecting the rear frame to the front frame. This is advantageous during the assembly phase when the cycle is being manufactured and also during service when it is being maintained. Further, the fuel tank can be disposed adjacent the connecting portion between the front frame and the rear frame, that is, adjacent the frame gravity center. This minimizes the variations in the effective location of the gravity center due as fuel is depleted.

4. Fuel Distribution Enhancing Fuel Tank Means

This aspect of the present invention relates to a fuel tank for a motorcycle which can reduce variations in the location of the center of gravity of the cycle.

Prior Art Considerations

It is desirable that a motorcycle main frame, with a handle bar socket at the front portion thereof, be positioned, as close as possible to the pivot portion of the rear swing arm provided on the center frame. This phenomena may be termed "neighboring to pivot portion". It is further desirable that a fuel tank be positioned adjacent the frame center of gravity center so as to minimize the variations in the positioning of the center of gravity center as the fuel quantity is depleted. This phenomena may be termed "neighboring arrangement to the gravity center".

There is a published Japanese patent application No. 157974/1985 which may be considered as one example of the prior art which can achieve the "neighboring to pivot portion" in an off-road motorcycle a published Japanese patent application No. 92974/1986 shows an off-road motorcycle with an auxiliary fuel tank disposed below the seat.

The object of the present invention is to present a fuel tank which can satisfy both demands of the "neighboring to pivot portion" and the "neighboring arrangement to the gravity center" and further easily, and effectively, and solidly support the seat.

In order to achieve the object described above, a fuel tank for a motorcycle according to the present invention provides, laterally bifurcated fuel tank means in vertical hanging or depending condition, which are supported by a main frame, and are located on both right and left sides of the main frame, back of an engine cylinder and above a crankcase. An upper communicating portion of the fuel tank has a flat summit wall which connects each of the upper portions of the right and the left vertical hanging fuel tank portions and extends longitudinally above and across the center frame, the seat rail and the main frame mentioned above.

FUNCTION OF THE INVENTION

A fuel tank is able to be positioned adjacent to the gravity center of the motorcycle as close as possible due to a construction wherein the vertical hanging portions of the fuel tank are disposed on both the right and the left sides of the frame, back of the engine cylinder and above the crankcase, with an upper communicating portion extending above the center frame, the seat rail and the main frame. Further, by achieving "the neighboring to pivot portion" of the main frame, if there would be a large distance from the seat, the flat summit wall provided in the upper communicating portion can support the seat bottom surface.

PREFERRED EMBODIMENT AND EFFECT OF INVENTION

Figure 16:
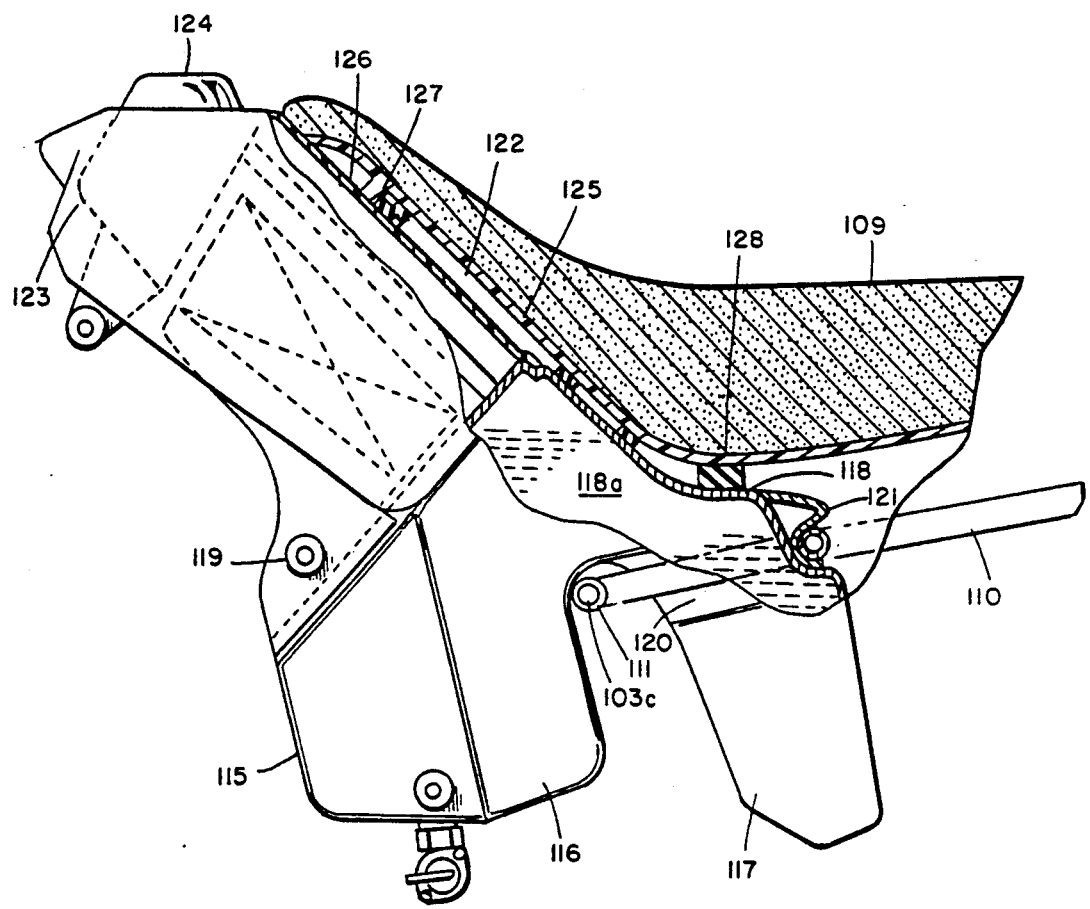

FIGS. 14 to 16 show a preferred embodiment according to the present invention.

FIG. 14 is a side view of an "off-road" motorcycle, i.e. a motocross.

FIG. 15 shows the assembly process of the fuel tank and the seat rail to the front frame.

FIG. 16 illustrates the seat supporting construction of the fuel tank.

In the drawings, numeral 101 and 102 are a front wheel and a rear wheel which are mounted together with an engine 107 on the front frame. This front frame is constituted by a main frame 103, a center frame 104, a downwardly extending frame 205 and a lower plate 206.

Numeral 208 is a shock absorbing unit of the rear wheel suspension and numeral 209 is a seat, the rear part of which is supported to a seat rail 110.

Numerals H, P and A are respectively a handle bar socket or head pipe, a pivot portion, and a rear swing arm.

The main frame 103 and the center frame 104 are disposed relatively close to a straight line extending between the headpipe H and the pivot portion P in order to establish the "neighboring to pivot portion" for the main frame 103.

The seat rail 110 includes a pair of right and left elements as shown in FIG. 15. The mounting or installing portions 111, formed at the front end portions of these elements, are connected to a transverse frame pipe element 103b. These portions 11 are thus mounted in a projecting portion 103a formed at the rear portion of the main frame 103 by means of a bolt 103c passing through 103b and a nut 103d. The rear portion of the seat rail 110 extends rearwardly in an upwardly inclining manner and is reinforced at the front and rear portions thereof by means of the cross members 112 and 113. A rear stay 114, providing a truss-like construction, is connected to the rear end portion of the cycle. The rear stay 14 is connected to the center frame 114 through bracket means and, together with a seat rail 110, constitutes the rear frame.

The projecting portion 103a, which connects the main frame 103 to the seat rail 110, is disposed adjacent the frame gravity center and supports the upper portion of the shock absorbing unit 109. The fuel tank is installed so as to extend longitudinally across and over the projecting portion 103a.

As earlier noted, the fuel tank 115 consists of a front chamber 116 and a rear chamber 117 which constitutes vertical hanging portions according to the present invention. An upper communicating portion 118 affords communication between the upper portions of both of the front and rear chambers described above. Further, the front chamber 116 is formed as a laterally bifurcated fuel tank and thus provides depending or hanging side portions at both right and left sides of the cycle, back of the cylinder 107a of the engine 107 and above the crankcase 107b. Tank 115 is connected with the sides of the main frame 103 through the upper fitting portions 116a by means of a bolt 119.

The rear chamber 117 has the U-shaped channel groove 120 framed in the side wall and rear wall thereof. The side portions of the groove receive and extend along the seat rail 110 when the rear chamber 117 engages the front end portion of the seat rail 110. The fitting portion 121, having a U-shaped vertical cross section, is provided at the rear wall upper portion of the rear chamber 117, and receives the cross-member 112. The rear chamber 117 is mounted to the main frame 103 in such a manner that the seat rail 110 is secured to the pipe portion 3b.

The upper communicating fuel tank portion 118 provides communication between each upper portion of the right and the left chambers of the front chamber 116 and further, in the present embodiment, communicates also with the upper portion of the rear chamber 117. The upper communicating portion 118 extends longitudinally forward from the seat rail 110 to the main frame 103 above the projecting portion 103a of the center frame 104. The upper portion of the summit wall above the rear chamber 117 is flat and formed as the flat summit wall 118a. Filling of the tank is accomplished through a sub-tank 123 and a cap 124 which is housed within a cover 122 provided at the front upper side of the main frame 103, generally as heretofore described.

FIG. 16 is a drawing showing the mounted condition of the seat 209. A socketed fitting portion 126 is provided at the front end portion of the bottom plate 125 of the seat 109. A fitting element 127, with an enlarged head which projects upwardly from the cover 122, is socketingly inserted into the socketed fitting portion 126.

The bottom plate 125 of the seat extends along the rear portion of the cover 122 and the upper communicating portion 118 and is supported on the flat summit wall 118a through a damping or shock absorbing element 128 like a rubber plug means.

The installation of the seat will now be described.

At first, the fitting portion 126 at the front end portion of the bottom plate 125 is connected to the fitting element 127 of the cover 122. Then, the rear portion of the seat is connected to the seat rail 110 by means of conventional means like bolts. This ensures that the seat 109 is securely supported at the flat summit wall 18a. There is not required a special separate mounting element due to the inclusion of the "neighboring to pivot" of the main frame.

As the upper communicating fuel tank portion 118 is supported by the seat rail 110 and the main frame 103, load from the seat 109 can be spread over a wide range. Therefore, it is possible to ensure the rigidity of the connecting portion of the seat to the seat rail 110 and the main frame 103. Further, according to the present embodiment, as the fuel tank 115 is installed so as to extend longitudinally across and over the pipe portion 103b which is the connecting portion between the front frame and the rear frame, the fuel tank can be positioned uniquely close to the center of gravity of the frame.

5. Scope of Invention

Those skilled in the motorcycle art and made familiar with this disclosure will readily appreciate that the invention may be practiced using changes, additions, deletions, substitutions, and/or equivalents in relation to the illustrated embodiments, such variations falling within the scope of this invention as set forth in the appended claims.

What is claimed is:

1. An air flow exhausting device for a vehicle radiator in which:
    a rear portion of a shroud covering an outside portion of a radiator is provided, with said rear portion at least partially overlapping and being connected to an outside surface of a fuel tank; and
    an air exhaust port is formed at a connecting location between said radiator and said outside, fuel tank surface;
said device being characterized in that:
    said radiator is provided laterally of a cylinder of an engine associated with said radiator;
    said fuel tank is arranged generally rearwardly of said radiator and disposed generally intermediate of a generally lower location of a vehicle seat and a generally upper location of an engine carburator;
    a tapering, laterally diverging fuel tank portion is formed to extend and expand rearwardly from a location at which said fuel tank and said shroud overlap each other; and
    said air exhaust port is formed between said tapering, fuel tank portion and said shroud and includes
    a laterally outwardly directed exhaust gas exit disposed generally rearwardly of said radiator.

2. A wind exhausting device for a vehicle radiator according to claim 1, wherein:
    an upper cover is provided generally above said shroud;
    an intake chamber is formed inside said upper cover; and
    said shroud cooperates with said upper cover to define an air cleaner inlet for said engine segregated from said radiator.

3. An air flow exhausting device as described in claim 1 incorporated in a motorcycle including:
    a motorcycle body having frame means;
    front and rear wheel means supported on said frame means;
    fuel tank means including said fuel tank;
    engine means carried by said frame means, operable to receive fuel from said fuel tank means, and providing driving power for at least one of said wheel means; and
    shock absorber straddling, fuel tank means;
    said shock absorber straddling fuel tank means comprising:
        a main frame included in said frame means and extending generally in front and rear directions of said motorcycle body;
        a center frame included in said frame means extending and generally in up and down directions of a rear portion of said main frame;
        a rear swing arm pivotably mounted on said center frame; and
        a rear, shock absorbing unit connected between said swing arm and said rear portion of said main frame;
    said fuel tank means being mounted with portions thereof disposed to straddle said rear shock absorbing unit in a manner to provide
    fuel tank portions extending in front and rear directions from said shock absorbing unit.

4. An air flow exhausting device as described in claim 1 incorporated in a motorcycle including:
    a motorcycle body having frame means;
    front and rear wheel means supported on said frame means;
    fuel tank means including said fuel tank;
    engine means carried by said frame means, operable to receive fuel from said fuel tank means, and providing driving power for at least one of said wheel means; and
    rear frame mounting enhancing, fuel tank means;
    said rear frame mounting enhancing, fuel tank means comprising:
        a pair of right and left rear frame members of said frame means reinforced by
            a cross-member extending transversely of the longitudinal direction of said rear frame members;
        said rear frame members being detachably connected to a front frame of said frame means which supports
            said rear wheel means;
            said front wheel means; and
            said engine means;
        said fuel tank means for said motorcycle being disposed adjacent connecting juncture means between said rear frame members and said front frame; and
        said fuel tank means including generally longitudinally extending groove means provided by side walls of said fuel tank means and operable to receive said rear frame members, and a fitting stay for vertically securing said crossmember provided at the rear wall portion of said fuel tank means, said fuel tank means being mounted on said front frame with said rear frame members being directly connected to said front frame but laterally spaced by a distance less than the width of said fuel tank means.

5. An air flow exhausting device as described in claim 1 incorporated in a motorcycle including:

a motorcycle body having frame means;

front and rear wheel means supported on said frame means;

fuel tank means including said fuel tank; and engine means carried by said frame means, operable to receive fuel from said fuel tank means, and providing driving power for at least one of said wheel means; and load distribution enhancing means including said fuel tank means;

said load distribution enhancing means comprising:

a main frame of said frame means including
a generally tubular, handle bar socket means at the front end portion thereof, and
a rear portion;

a rear swinging arm;

a centerframe which connects to said main frame rear portion, extends generally downwardly, and provides a pivot portion for pivotally mounting the front end portion of said rear swing arm;

a seat rail extending rearwardly from said main frame rear portion to support a seat; and said fuel tank means includes
right and left depending portions
supported by said main frame,
extending generally rearwardly of an engine cylinder, and
being located generally above an engine crankcase,
an upper communicating portion providing communication between the upper portions of said right and left depending portions, and
flat summit wall means of said connecting portion extending from said seat rail to said main frame across said center frame.

6. An air flow exhausting device as described in claim 1 wherein:

said engine includes a crankcase with a generally upright cylinder extending upwardly from a front portion thereof;

said carburator is located on an upper, rear portion of said crankcase;

said radiator has a longer side oriented in a generally upright manner, with said radiator being located laterally of said generally upright cylinder; and said fuel tank is disposed above said engine and rearwardly of said radiator.

* * * * *